Oct. 24, 1967  J. U. ROE  3,348,411
RECORD CARD VERIFYING MACHINE
Filed May 3, 1965  11 Sheets-Sheet 1

INVENTOR.
JONATHAN U. ROE
BY
Charles P. Boberg
ATTORNEY

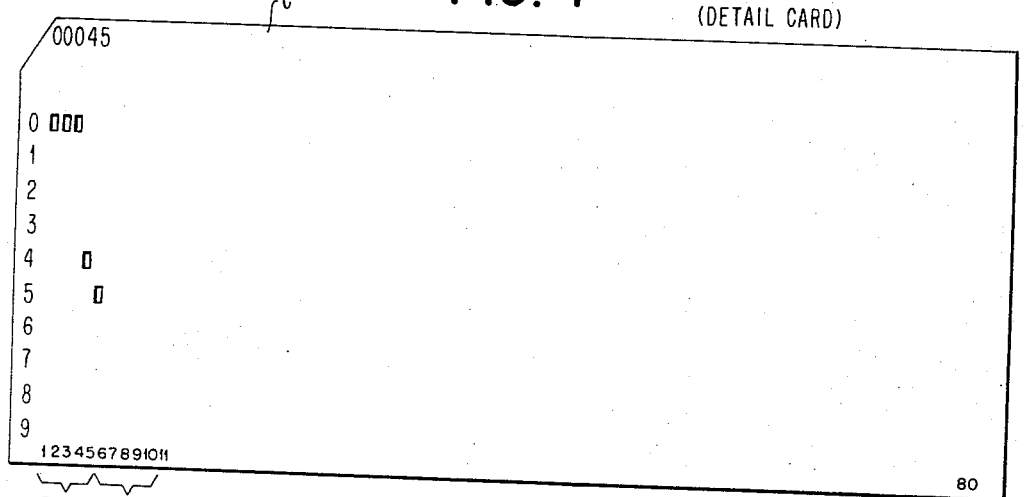
FIG. 4 (DETAIL CARD)
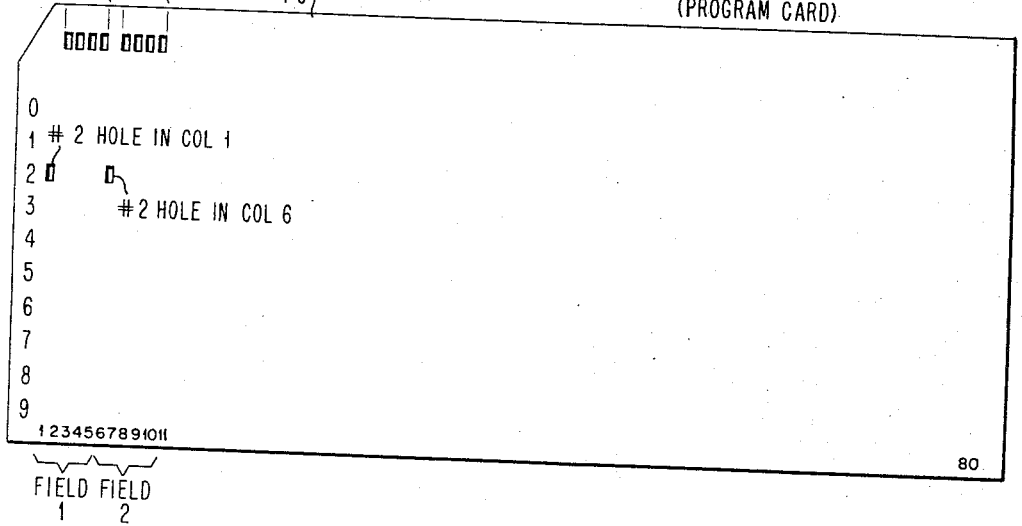
FIG. 5 (PROGRAM CARD)
FIG. 6
| FIG. 6A | FIG. 6B | FIG. 6C |
|---|---|---|
| | FIG. 6D | FIG. 6E |

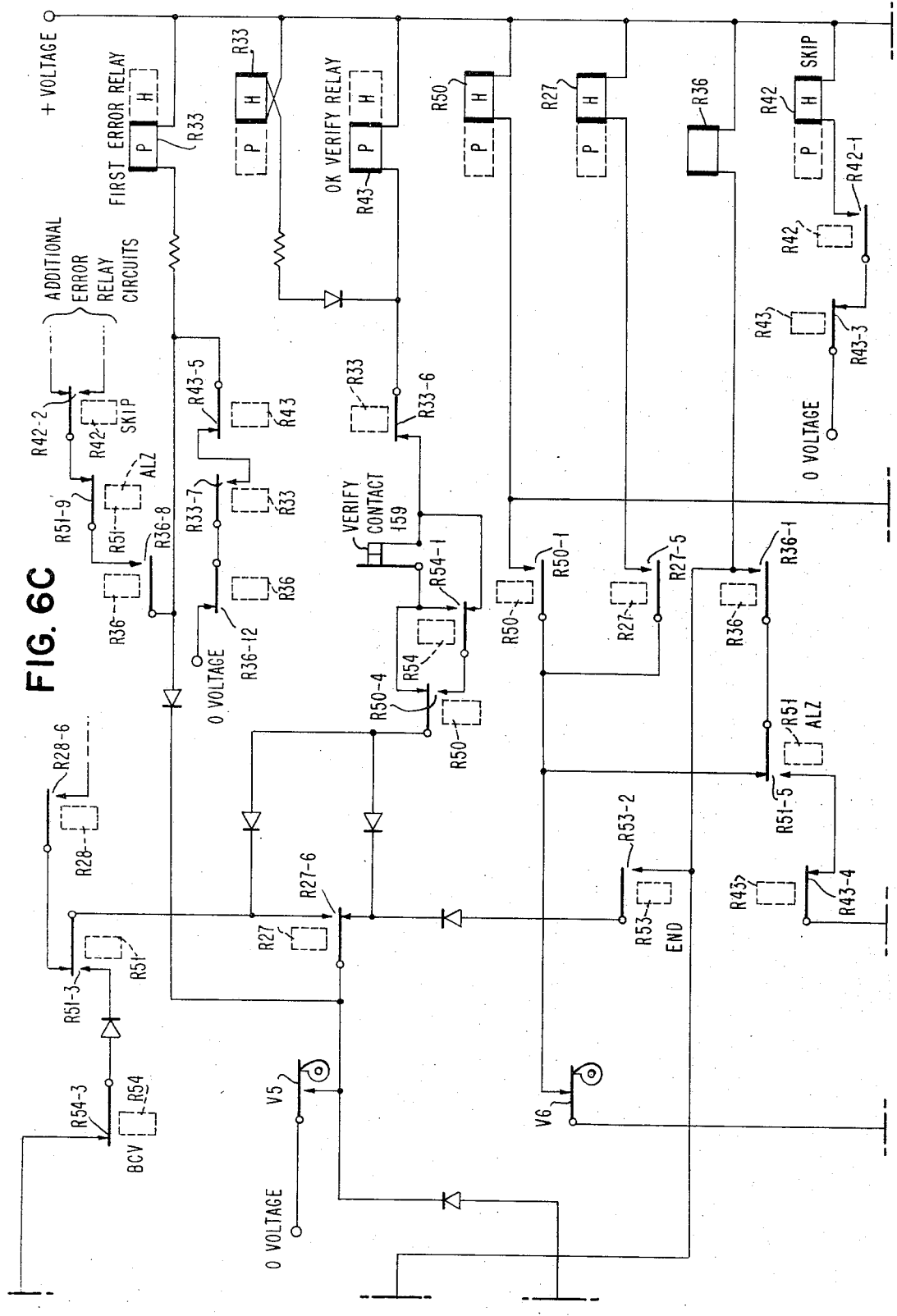

Oct. 24, 1967    J. U. ROE    3,348,411
RECORD CARD VERIFYING MACHINE
Filed May 3, 1965    11 Sheets-Sheet 10

FIG. 8

United States Patent Office 3,348,411
Patented Oct. 24, 1967

3,348,411
RECORD CARD VERIFYING MACHINE
Jonathan U. Roe, Wappingers Falls, N.Y., assignor to International Business Machines Corporation, Armonk, N.Y., a corporation of New York
Filed May 3, 1965, Ser. No. 452,792
11 Claims. (Cl. 73—156)

ABSTRACT OF THE DISCLOSURE

A punched card verifier operates to verify left zeros or blank columns in program defined fields of a punched card being verified and to require manual or key verification of any significant digits or data within such fields. A program card mounted on a program drum defines the mode of operation and each field. When a field so programmed is reached, the verifier automatically starts verifying that zeros are punched in each column. Such verifying action continues until a significant digit, a blank column, or the end-of-field is reached. The same program definition is used for both left zero and blank column verification. But, blank column verification is initiated by the operator pressing a control key that causes the verifier to skip over and verify blank columns until a non-blank column or end-of-field is reached.

---

This invention relates to record card verifying machines in which some of the machine functions are performed under the manual control of an operator and other machine functions are performed automatically under the control of a program card or the like.

The purpose of a card verifying machine is to check the accuracy of data recorded in a detail record card against the original or master data. During those periods of its operation in which the machine is manually controlled, it functions to check the data recorded in designated fields of the detail cards against information which is manually entered into a keyboard by an operator. At other periods in its operation the machine may function automatically, as it does, for example, when executing auto-verification or other automatic functions known to the art. Such automatic operations of the machine may be initiated at the will of the operator, when she presses selected control keys, or they may be initiated automatically when the machine senses predetermined control indicia in a program card that is being read concurrently with the advance of the detail card.

Since automatic verifying operations of the machine are accomplished much more rapidly than are keyboard-controlled verifying operations, it is desirable to reduce the number of key actuations wherever possible. One way to accomplish this is to arrange the machine so that it automatically verifies "left-zeros" (that is, zeros to the left of the first significant digit) in all fields of the card where any manual verification is to be performed. This considerably reduces the time required for performing manual verifications. In this connection, it has been proposed heretofore to equip a verifying machine with what is called a "decimal tab" feature for enabling the machine to perform automatically any number of consecutive zero verifying steps manually preselected by the operator. For example, if the operator sees that a ten-column field is supposed to contain only six significant digits, she then (according to this practice) selects and depresses a decimal tab key signifying that automatic left-zero verifications should be made in four consecutive columns. The machine thereupon proceeds automatically to check for the selected number of left zeros (i.e., four) in that field. This type of operation is not completely automatic in that it requires the operator, first, to perform a mental calculation, and then manually select a key representing the correct number of columns in which zero verifications are to be performed by the machine. Hence, this method is subject to human error and to the inherent limitations in speed which are involved in making a mental decision and selecting the number of columns to be zero-checked. A more completely automatic type of left-zero verification (specifically, one that is program-controlled) would greatly increase the machine efficiency.

Another instance where improvement can be made in verifying operations is in the verification of blank columns. Prior verifying machines have been equipped with provisions for skipping any selected field of a card which was not to be verified. However, if one wanted to make certain that no data whatsoever had been recorded in any portion of a card, it was necessary to check for blank columns manually, thereby introducing the delays inherent in any manually performed, column-by-column checking operation.

A general object of the present invention is to improve the operation of card verifying machines by making available some additional types of automatically initiated and/or automatically controlled machine functions.

Another object is to enable the amount of program-controlled activity to be increased in relation to the manually controlled activity of such a machine.

A more specific object is to provide novel means for automatically verifying left-zeros in response to the sensing of control indicia in a program card, without any manual intervention or mental computation being required of the operator for this purpose.

Still another object is to provide automatic blank column verifying means adapted to operate without any manual intervention other than the actuation of a pre-determined key to initiate such verifying action, the machine itself selecting the columns to be automatically verified for blanks under the control of a program card.

The foregoing and other objects, features and advantages of the invention will be apparent from the following more particular description of a preferred embodiment of the invention, as illustrated in the accompanying drawings.

In the drawings:

FIG. 4 is a plan view of a detail record card perforated in accordance with a specific example chosen herein to illustrate the operation of the invention.

FIG. 5 is a plan view of a program card that may be employed for controlling the operation of the machine in conjunction with the specific example chosen for illustration herein.

FIGS. 6A through 6E, when arranged according to FIG. 6, constitute a schematic wiring diagram showing relevant portions of the electrical circuitry associated with said machine.

Figure 7:
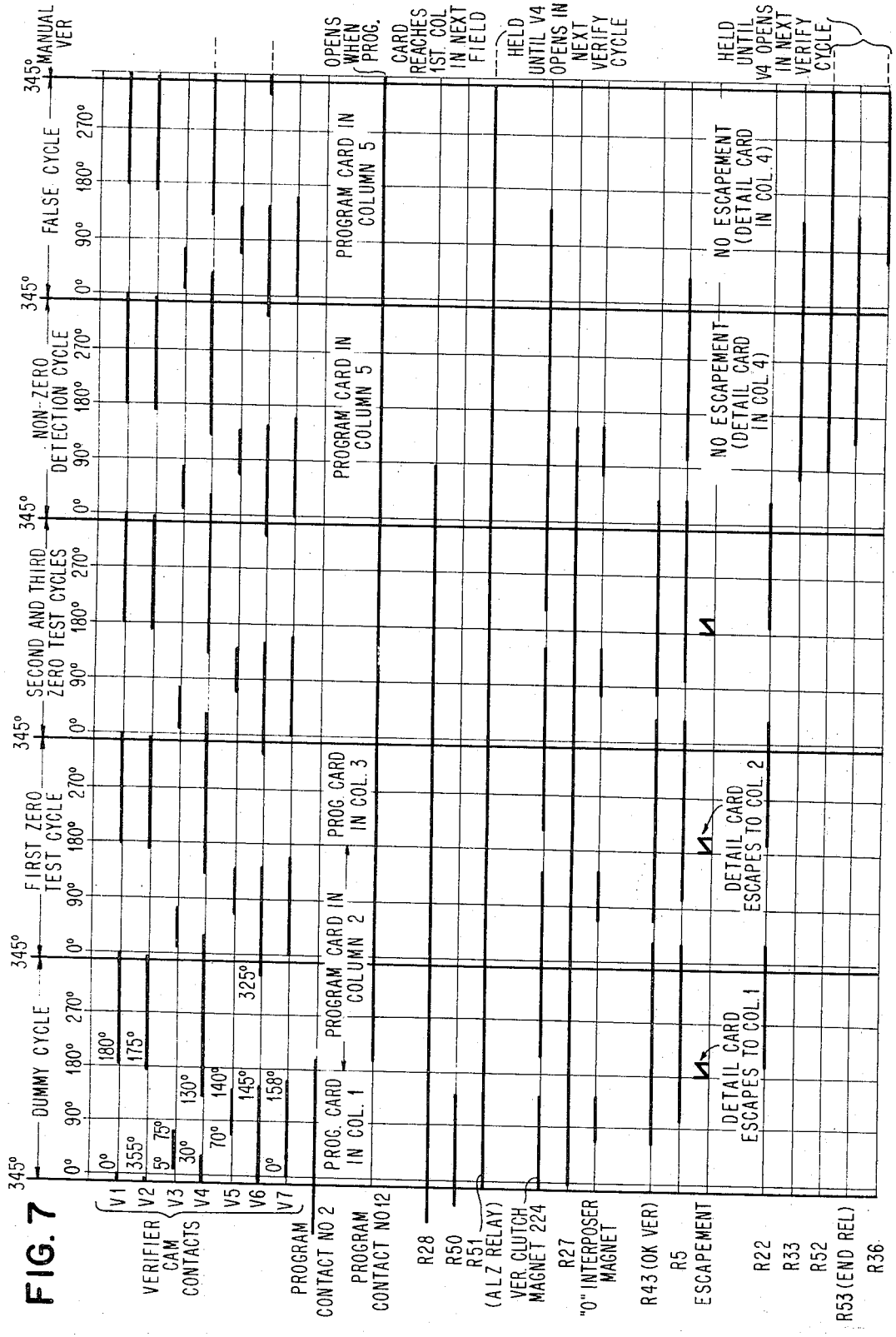

FIG. 7 is a timing diagram graphically illustrating portions of a typical automatic left-zero verifying operation.

Figure 8B:
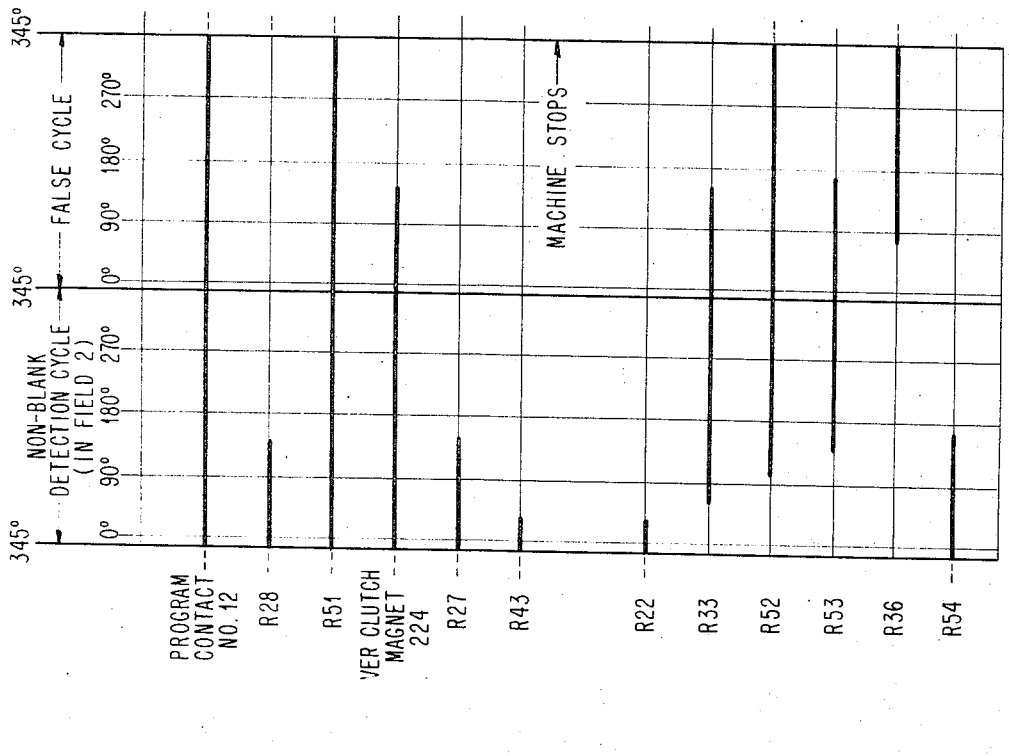
Figure 8A:
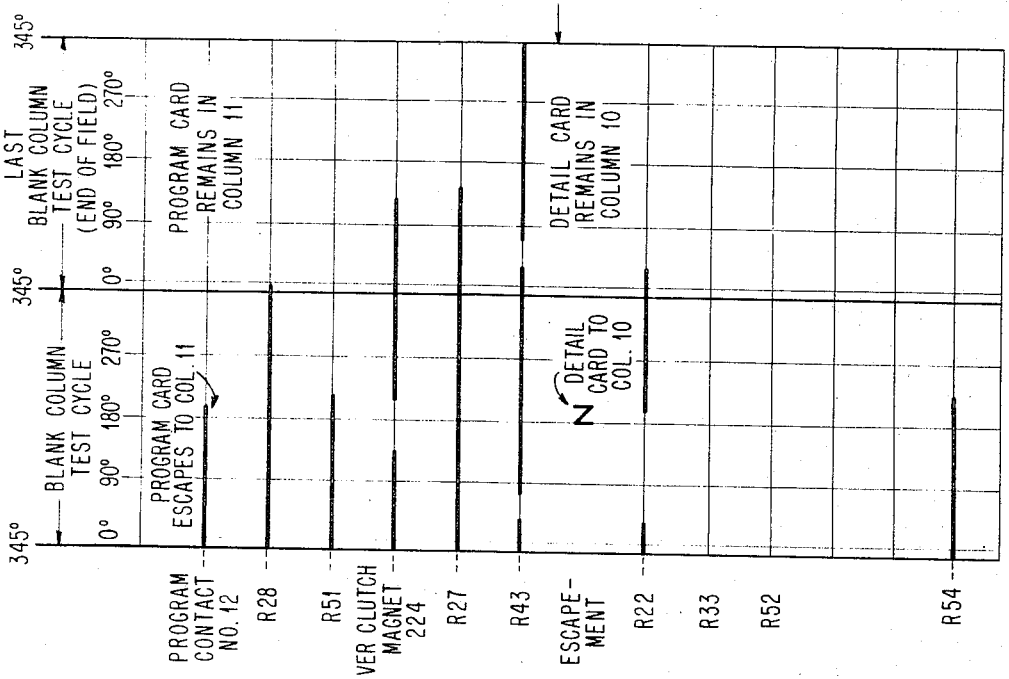

FIGS. 8, 8A and 8B are timing diagrams graphically illustrating certain portions of typical blank-column verifying operations.

The invention is disclosed herein as embodied in a verifying machine of a type similar to the well-known "IBM 56 Card Verifier." The basic mechanical construction of such a verifier is disclosed in numerous publications, including U.S. Patent No. 2,615,333, issued to E. W. Gardinor et al., and the copyrighted publication "IBM Customer Engineering Manual of Instruction for 56 Card Verifier." The "decimal tab" feature of the 56 Verifier (which herein is replaced by an "automatic left-zero verification" feature) is disclosed in U.S. Patent No. 2,841,981, issued to R. L. Rockefeller et al. As will be apparent to those skilled in the art, however, the present invention is not directed exclusively to the 56 Verifier but has application to other types of verifying machines as well, and there is no intention to limit the scope of the present teachings to the particular embodiment shown herein.

*General description*

In order to describe the operation of the invention, a very simple example is chosen for illustration herein. It will be assumed that a given detail card C, FIG. 4, has a data field occupying columns 1 to 5 thereof (herein designated "field 1") in which the respective columns are perforated to represent the quantity "00045," with the zeros being perforated in columns 1, 2, and 3 to the left of the first significant digit "4" in column 4, according to standard accounting machine practice. The next succeeding field 2 of the detail card C, consisting of columns 6–10, is assumed to be blank (that is, devoid of perforations). The particular manner in which the remaining columns 11–80 of the detail card C may be perforated or left blank is not considered material to the present explanation of the invention, and it generally will be disregarded herein. The card fields are not required to be of any given length, although it is evident that the invention offers no advantage unless it is employed for checking zeros or blanks in a field which contains at least two (and preferably more than two) columns.

The operation of the illustrated apparatus, under the presently assumed conditions, will be such that columns 1 to 3 of the detail card C are automatically checked for left-zeros by the machine. The operator is not required to initiate this left-zero checking operation in columns 1 to 3, for in accordance with the present invention, the machine is programmed to do this automatically in response to the sensing of a predetermined control indicium in a program card (FIG. 5), as will be explained hereinafter. Following this, columns 4 and 5 will be manually verified by the operator in a conventional manner, and as soon as the manual verification of columns 4 and 5 is complete, the machine automatically will check for left-zeros, find none and will stop temporarily in column 6, ready to perform a blank column verification in field 2 (columns 6–10) of the detail card C. The machine is placed in this condition of readiness automatically, under program control, as will be explained. Having observed that a blank field is to be verified, the operator then presses a special control key to initiate an automatic blank-column verifying operation in field 2. The operation of the machine thereupon will continue automatically to the end of the field 2, or until a non-blank error condition is detected, whichever occurs first.

The program card PC, FIG. 5, is a well-known type of control instrumentality which, in the present instance, is adapted in a novel fashion to control automatic left-zero and blank-column verification operations, along with other programmable machine functions of a conventional nature not described herein. Card PC is shown perforated in a manner suitable for controlling the aforesaid left-zero and blank-column verifying operations. Thus, in its first field (occupying columns 1 to 5) the program card PC contains a perforation in the No. 2 index position of column 1 and perforations in the No. 12 index positions of the remaining columns 2 to 5 of this field. Such a hole pattern signifies that an "automatic left-zero" (ALZ) verification is to be performed in detail card field 1, provided this field of the detail card C is not blank. The No. 2 code hole in column 1 of card PC, when sensed in the manner hereinafter described, conditions the machine for automatically checking the presence of zeros in all columns to the left of the first significant digit in field 1 of the detail card C, FIG. 4. The No. 12 code holes in columns 2 to 5 of program card PC are known as "field definition" holes, that is, they serve to designate the remaining columns of field 1. Once an automatic verifying operation (such as left-zero verification) has been initiated, the field definition holes serve to continue such operation as long as it may be needed, but such indicia will be ineffective while manual verification is in progress.

When the verifying operation has progressed to field 2, which is blank, the machine thereupon is conditioned by the pattern of code holes in field 2 of the program card PC to perform an automatic blank-column verification (BCV) operation. It will be noted in FIG. 5 that field 2 of the program card PC is perforated in the same manner as field 1; that is, it contains a No. 2 program code hole in the first column 6 and No. 12 field definition holes in the remaining columns 7 to 10 of this field. Hence, as far as the program card PC is concerned, there is no distinction between ALZ and BCV operations. However, the absence of zeros in field 2 of the detail card C, FIG. 4, alters the manner in which the machine responds to the sensing of the No. 2 program code. As will be explained in greater detail hereinafter the No. 2 program code prepares the machine for performing ALZ and BCV operations, but when blank columns are present, the machine is unable to perform an ALZ operation due to the absence of zeros, and it cannot automatically initiate a BCV operation. Hence, the machine at this stage must await a signal from the operator in order to commence checking automatically for blanks in field 2 (columns 6 to 10) of the detail card C.

The foregoing is a brief general description of the manner in which the invention operates under the conditions chosen for illustration herein. A more detailed description of the invention now follows.

*Mechanical details (FIGS. 1, 2 and 3)*

Figure 1:
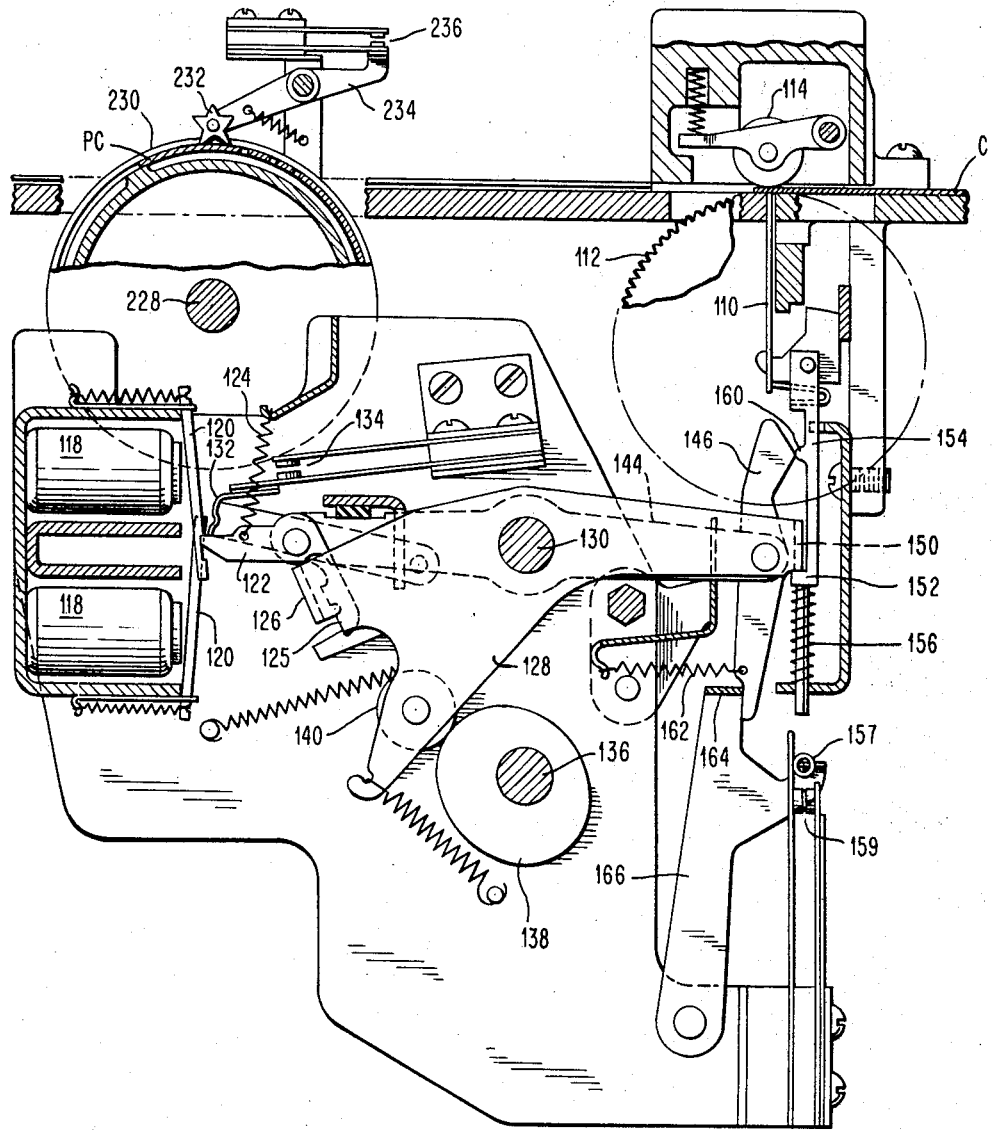
FIG. 1 is a vertical sectional view showing some mechanical details of a record card verifying machine in which the invention has been embodied.
Figure 2:
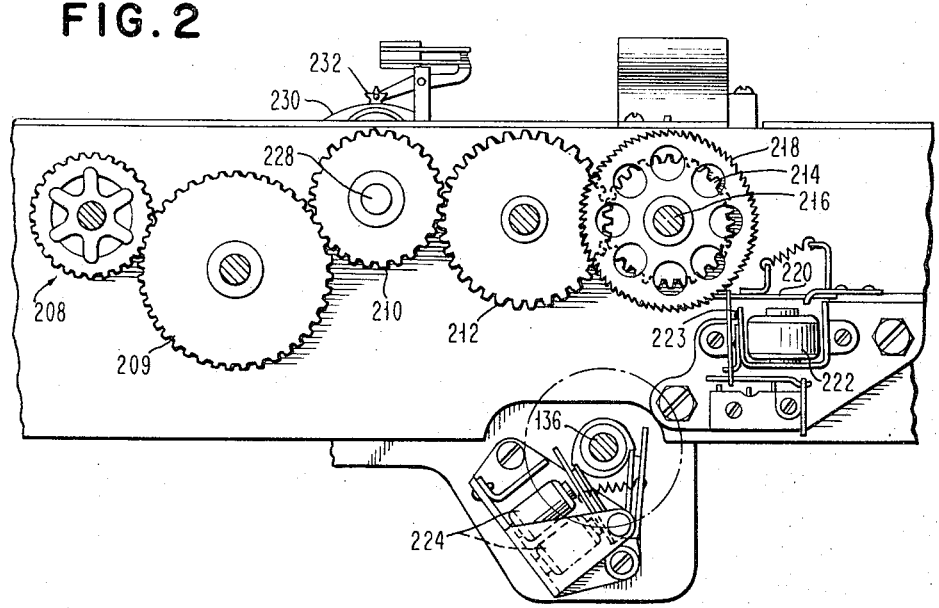
FIG. 2 is a side elevation of a card escapement mechanism and certain related parts of said machine.
Figure 3:
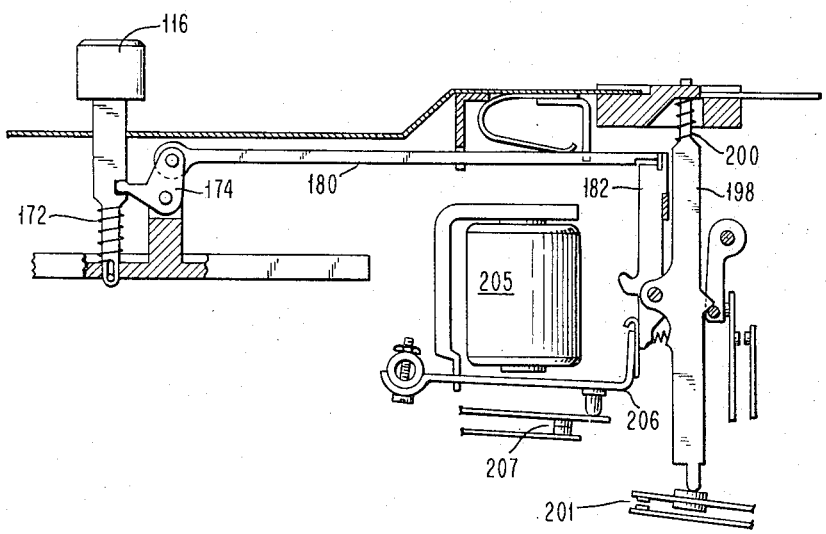
FIG. 3 is a vertical sectional view of a key mechanism employed in said machine.

FIGS. 1, 2 and 3 illustrate the relevant mechanical details of a modified "IBM 56 Card Verifier" in which the invention is herein assumed to be embodied. The basic mechanical construction of the type 56 verifier is well known and is disclosed, for example, in the publications mentioned hereinabove. Inasmuch as the present invention resides in certain novel features of a modified electrical circuitry rather than in the mechanical details of the machine, the latter will be described merely to the extent necessary for understanding the germane aspects of the circuitry.

Referring to FIG. 1, a row of sensing pins 110 is arranged at a verifying station for checking the data (or absence of data) recorded in the columns of a detail record card C, which card is advanced past the verifying station by a card feed roller 112 in cooperation with the pressure roller 114. Only one of the sensing pins 110 is shown in FIG. 1, and it will be assumed that at least twelve such sensing pins are provided, one for each index position of a card column. In some instances it has been proposed to utilize a pair of sensing pins for each index position. Sensing elements of still other types may be used within the purview of the invention.

When a detail card C is being manually verified in the customary manner, keys such as 116, FIG. 3, are selectively actuated by the operator according to the data to be verified in the card C. If the data entered into the machine by way of the keys 116 checks with the data sensed in the card C by the pins 110, a "verify" condition is established, and the card C is permitted to continue its advancing movement, column-by-column, through the verifying station. If an error is detected, however, the machine furnishes an error indication, and the card C stops advancing until the data therein can be rechecked.

Each time a key 116, FIG. 3, is actuated, a corresponding interposer magnet 118, FIG. 1, is energized to attract its armature 120. The interposer magnets 118 are arranged in upper and lower rows to conserve space. When an armature 120 is attracted, it releases an associated interposer 122, which is biased in a clockwise direction as viewed in FIG. 1 by an individual spring 124. The released interposer 122 thereupon rotates in a clockwise direction to move a hooked end 125 thereof under a bail 126 extending between two rocker arms 128 pivoted on a shaft 130. The actuated interposer 122, through a bail 132, also closes a pair of contacts 134 common to all of the interposers. Closure of contacts 134 initiates what is known as a "verifying cycle" of the machine by energizing a verifier clutch magnet 224, FIG. 2.

The clutch magnet 224 controls a one-revolution clutch of well-known construction mounted on a verifying cam shaft 136, FIGS. 1 and 2. The cam shaft 136 mounts a number of timing cams that control various electrical contacts, the functions of which will be described hereinafter in connection with the circuit diagram. The verifier clutch operates in a fashion such that the timing cams thereon normally come to rest in their 345° positions (this being an arbitrarily chosen latch-up point), so that a verifying cycle which is initiated by energization of the clutch magnet 224, FIG. 2, will run from a 345° point of one cam shaft revolution to the 345° point in the next revolution of the shaft.

Mounted also on the verifier cam shaft 136 is a cam 138, FIG. 1, cooperating with a cam follower 140 mounted on one of the rocker arms 128 carrying the bail 126. As cam 138 rotates, the bail 126 is caused to swing in a counter-clockwise direction, as viewed in FIG. 1. Latched to this bail 126 will be the actuated interposer 122 (that is, the interposer whose magnet 118 has been energized). Each interposer 122 is pivotally mounted on one end of an individual arm 144, each of these arms being pivotally mounted near its midpoint on the shaft 130. Pivotally mounted on the other end of each arm 144 is a vertically extending finger 146. The energizing of an interposer magnet 118 causes the associated interposer 122 to rock under the influence of its spring 124, closing the interposer bail contacts 134 and also latching the associated arm 144 to the rocker bail 126. As the bail 126 descends, the contacts 134 open, and the associated finger 146 is caused to rise.

Figure 6A:
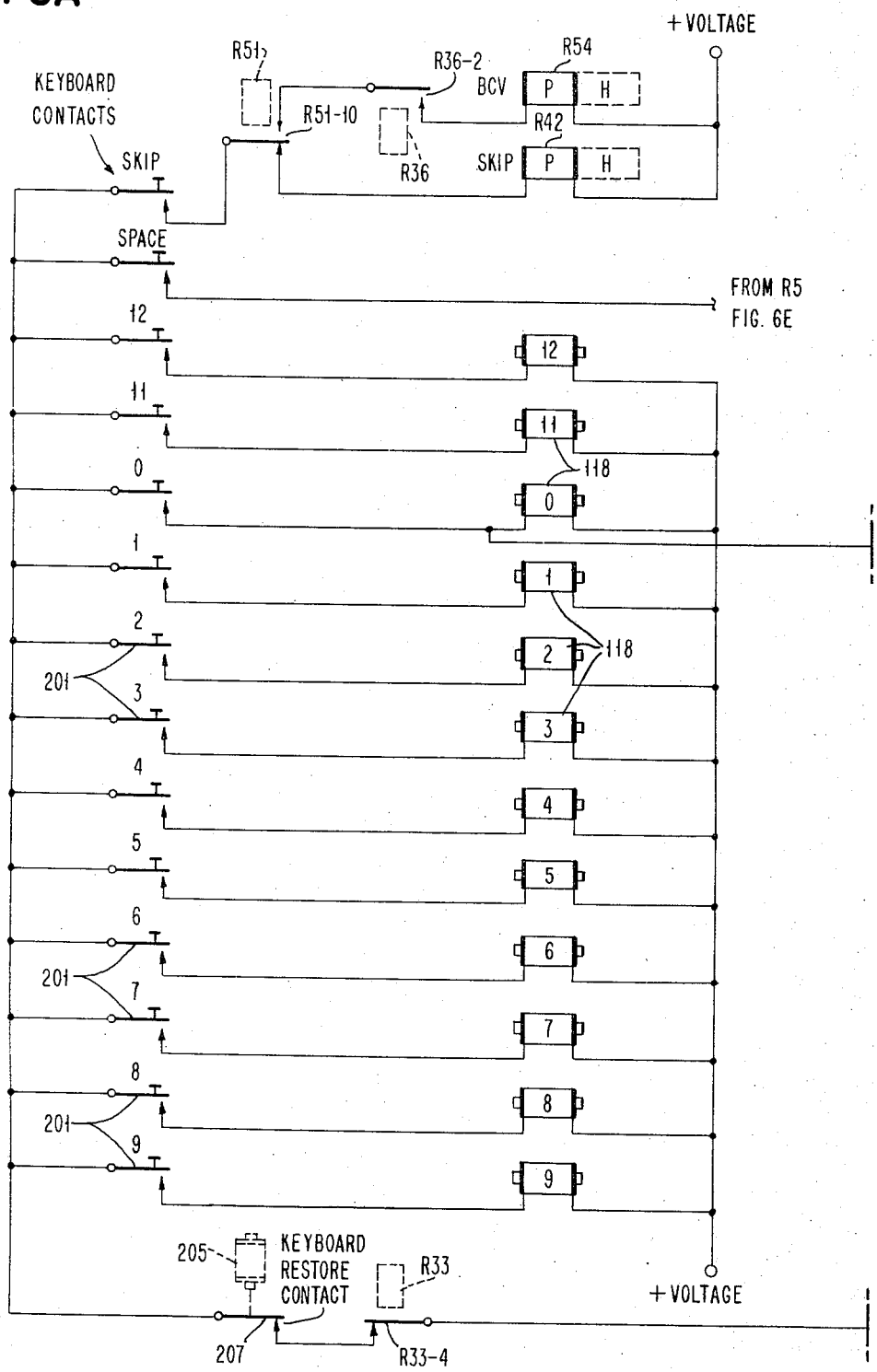
FIG. 6 is a diagram illustrating the proper arrangement of FIGS. 6A through 6E.

A bail 150, FIG. 1, extends between the ends of the rocker arms 128 remote from the bail 126, and this bail 150 cooperates with certain offset portions 152 of vertically movable elements 154 (one for each sensing pin 110) to hold these elements 154 normally in a downward position, as shown in FIG. 1, against the pressure of their springs 156. An element 154 is provided for each index position of a card column. There is no interposer 122 nor any element 154 corresponding to the "space" key of the keyboard (FIG. 6A). Each element 154 supports a sensing pin 110 in a well-known manner. During a verifying cycle the bail 150 rises, thereby freeing the elements 154 to the action of their respective springs 156. At those index positions of the sensed card column which do not contain holes, the pins 110 and their associated elements 154 are arrested as the pins contact the card surface. However, if one or more index positions contain holes, the corresponding pin or pins 10 will rise to the limit of their upward movement, with the pins passing through the aligned holes.

Means are provided for indicating whether the data sensed by the pins 110 in the card column being verified corresponds to the data represented by the selective energization of the interposer magnets 118. Associated with the fingers 146 is a bail 164 mounted on arms 166 (only one of which is shown in FIG. 1), which bears against the lower end of the fingers 146. One of the arms 166 supports a roller 157 that engages one blade of a pair of "verify" contacts 159 that normally are in a closed position as shown. These verify contacts 159 will open only when one of the fingers 146 has been rocked out of its normal position shown in FIG. 1, in a manner to be explained.

The upper end of each finger 146 has a projection that normally engages a corresponding projection 160 on the associated element 154. If a pin 110 senses a hole in the card, causing its element 154 to rise, while the corresponding finger 146 also is permitted to rise due to the energizing of its interposer magnet 118, the projection 160 then remains engaged with its mating projection on the finger 146 throughout the respective upward movements of these parts. Under these conditions the finger 146 does not rock about its pivot as it rises. However, if a pin 110 senses a hole and rises, while at the same time the corresponding finger 146 is held in its lowermost position due to the failure of its interposer magnet 118 to energize, then the finger 146 will be rocked clockwise, as viewed in FIG. 1, by its tensioning spring 162 as the mating projections slide apart. Likewise, if a finger 146 is released and rises due to the energization of its interposer magnet 118, while the associated element 154 fails to rise because its sensing pin 110 has not encountered a perforation, the finger 146 again will rock clockwise for the same reason. When any of the fingers 146 is rocked in the manner just explained due to a lack of correspondence between the data sensed in the card column and the data represented by the interposer settings, the bail 164 is rocked counter-clockwise, causing the arms 166 to pivot and open the verifying contacts 159. The opening of these contacts 159 signifies a condition of non-verification.

Referring now to the details of the key mechanism illustrated in FIG. 3, when a key 116 is manually depressed against a spring 172, a bell crank 174 associated with this key is rocked to pull a link 180. Each link 180 is engaged with a respective latch element 182 pivotally mounted on a vertically movable finger 198. This mechanism is familiar to those skilled in the art and will not be described in greate detail. Actuation of a key 116 releases the corresponding latch element 182 and enables the associated finger 198 to move downwardly under the influence of its spring 200 to close a pair of contacts 201 associated therewith, there being one pair of contacts 201 for each key 116. At a suitable time after the contacts 201 have been selectively closed, a keyboard restore magnet 205, FIG. 3, is energized to swing its armature 206 and thereby raise the elements 182 and 198 to relatch the same in their upper positions. A pair of normally closed contacts 207 is associated with armature 206 of the magnet 205 for a purpose which will be explained, these contacts 207 opening momentarily whenever the keyboard restore magnet 205 is energized.

The detail cards as C, FIG. 4, are fed in an incremental column-by-column fashion through the verifying station (FIG. 1) under the control of an escapement mechanism generally illustrated in FIG. 2. Power is constantly applied to a friction clutch, generally designated 208, and is transmitted through gears 208, 209, 210, 212 and 214 to a shaft 216. The shaft 216 also mounts a ratchet wheel 218, FIG. 2, and the card feed roller 112, shown in FIG. 1. When an escapement armature 220 of an escape magnet 222 is withdrawn from a tooth of the escapement wheel 218, power is transmitted through the friction clutch 208 and the intermediate gear train to the shaft 216, whereby this shaft is rotated and the card C is advanced. Normally the amount of advancing movement is limited to one column-space, inasmuch as the escape magnet 222 usually is deenergized almost immediately after the ratchet wheel 218 has been released, thereby causing the armature 220 to seat in the next succeeding tooth on this wheel. More extensive movements of the card can be accomplished by holding the magnet 222 energized for a long period of time, but this type of operation is not involved in the present description. An escapement armature contact 223, FIG. 2, is arranged so that it momentarily closes each time the escapement wheel 218 advances one tooth.

The shaft 228 on which the gear 210 is mounted also mounts a program drum 230, FIGS. 1 and 2, on which there is placed a program card PC, an example of which is shown in FIG. 5. The program card PC advances column-by-column concurrently with the advance of the detail card C. Star wheels 232 respectively mounted on pivoted arms 234 sense perforations in the program card PC in a known manner, causing the associated contacts 236 to close each time holes are sensed in the program card by the respective star wheels. In the present case attention will be given only to the star wheel contacts respectively associated with the No. 2 and the No. 12 index positions in the program card. Where a star wheel such as 232 encounters a series of consecutive perforations, such as the "12" holes in columns 2–5, FIG. 5, the star wheel 232 merely rotates without tilting the arm 234 on which it is mounted, thus keeping the associated contacts 236 closed continuously. The machine disclosed herein for illustrative purposes operates in such a manner that the program card is sensed one column in advance of the detail card. However, it is not essential that this mode of operation be employed in order to carry out the purpose of the invention, and the present teachings are not so limited.

*Circuit diagram—FIGS. 6A to 6E*

The portion of the machine circuitry which relates particularly to the invention herein disclosed is shown schematically in FIGS. 6A–6E, which are arranged in accordance with the layout shown in FIG. 6. This diagram does not purport to show all of the circuitry that would be included in this type of a verifying machine, and it will be understood that many relays and their associated contacts which in practice would be involved in the functioning of such a machine are omitted from the present showing. Such details are well known to those skilled in the art, however, and it is not considered necessary to disclose the same herein for a complete understanding of the present invention.

Wherever feasible, the reference numerals applied to the various circuit elements shown in FIGS. 6A–6E correspond to the reference numerals that are applied to elements shown in the standard wiring diagram of an IBM 56 Card Verifier. Certain elements (notably relays R51 to R54), however, have been added to the standard verifier circuits in order to carry out the functions contemplated by the present invention. R51, R52 and R53 are involved in "automatic left-zero" (ALZ) verifying operations, while R51 to R54 are involved in "blank-column verification" (BCV) operations.

*Automatic left-zero (ALZ) verification*

Referring to FIGS. 4 and 5, which respectively illustrate a specimen detail card C and program card PC involved in the specific example under consideration, the machine will be programmed by the card PC to check automatically for left zeros in field 1 (columns 1–5) of the card C. Thereafter, blank-column verification will be performed in field 2 (columns 6–10) as described subsequently herein.

When the detail card C initially is fed into the verifying station, it comes to rest in what may be called its "column-0" position, that is to say, with its column 1 still one step away from the sensing pins 110, FIG. 1. The program card PC, on the other hand, is already in its column-1 position, so that the No. 2 hole in its first column is being sensed by the aligned star wheel 232. Hence, the associated program contacts 236 for the No. 2 index position are closed to signify that the machine should check automatically for the presence of left zeros in the field being verified. Following closure of the No. 2 program contacts, the machine will execute at least three cycles, respectively consisting of a "dummy" cycle followed by one or more zero test cycles and a concluding cycle, called a "false" cycle. Each cycle of the verifying mechanism involves a revolution of the verifier cam shaft 136, FIGS. 1 and 2, and the timing cams mounted thereon, the respective functions of which will be described presently.

Figure 6B:
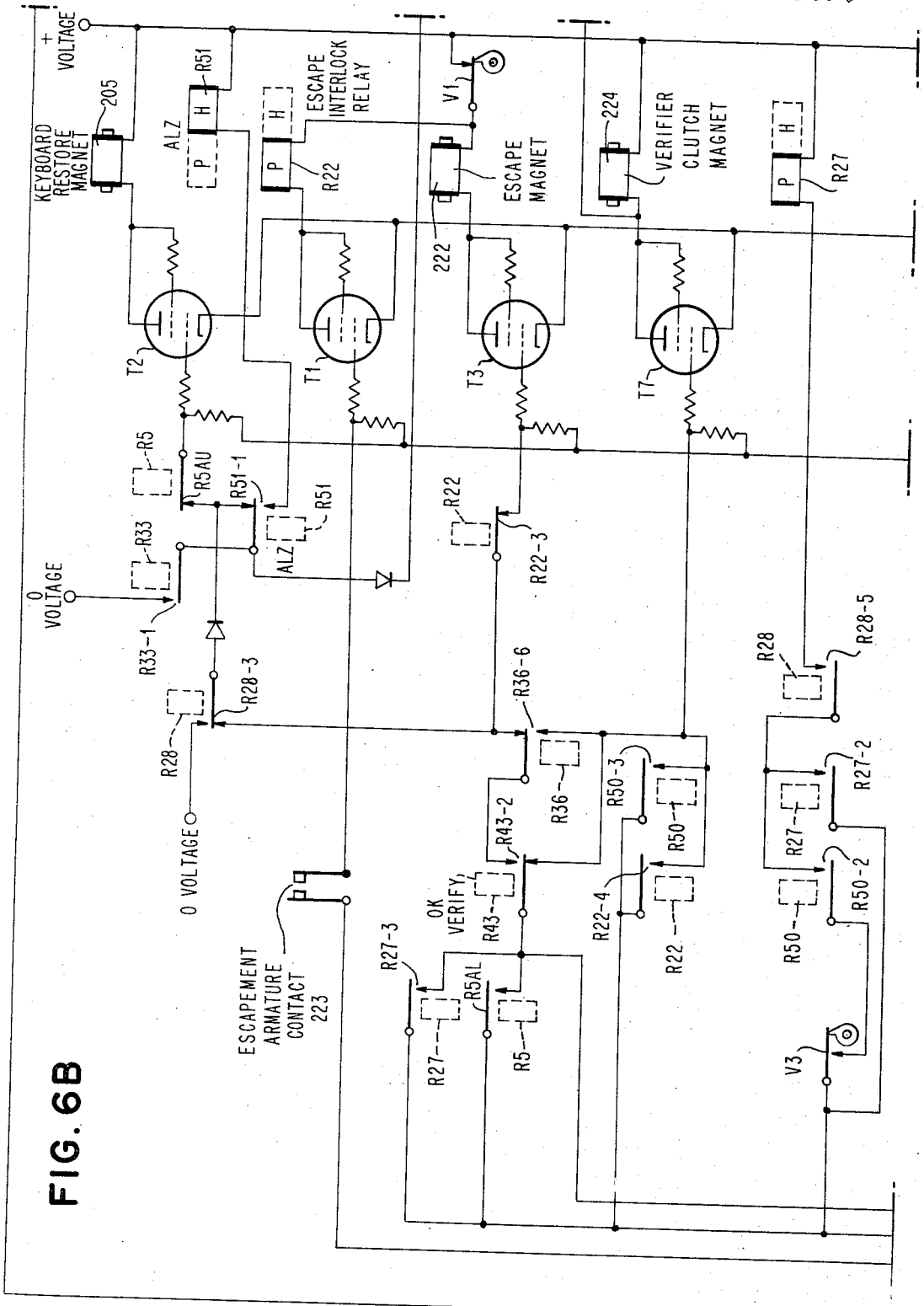
Figure 6D:
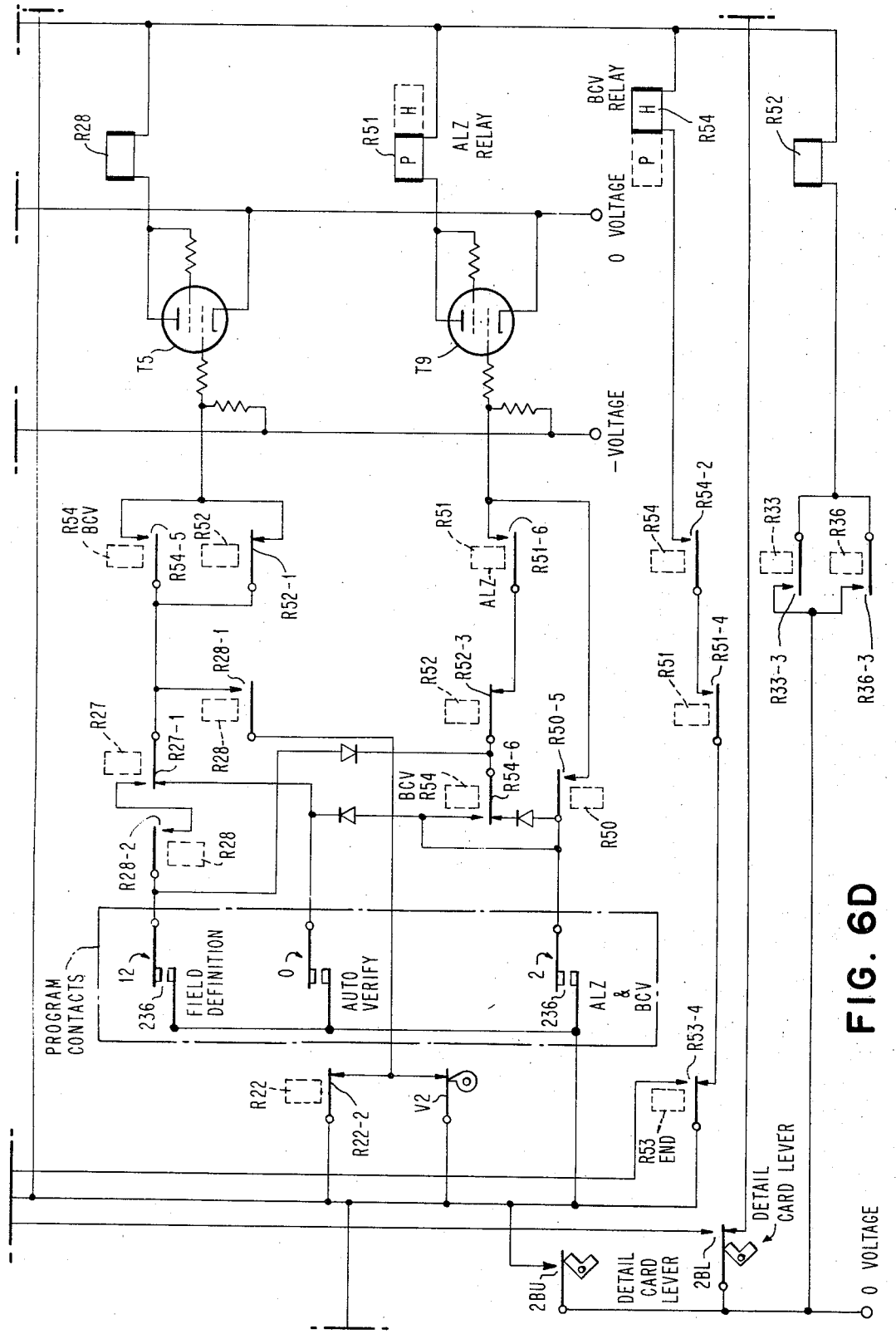

When the feeding of detail cards is begun, certain card lever contacts such as 2BU or 2BL, FIG. 6D (represented in a stylized manner herein), are transferred at an appropriate time. Throughout the present description it will be assumed that these card lever contacts remain in their transferred positions, so that they maintain certain connections to the zero-voltage terminal of a suitable voltage source.

Referring to the circuit diagram, FIGS. 6A–6E, in conjunction with the timing diagram shown in FIG. 7, the closure of the No. 2 program contact 236, FIG. 6D, extends a circuit from a source of zero voltage through normally closed relay contacts R27–1 and R52–1 to the control grid of a tube T5, which grid normally is biased negatively below its cut-off point. Tube T5 thereupon is rendered conductive, causing a relay R28 in its plate circuit to become energized. When R28 picks up, it closes an associated relay contact R28–4, FIG. 6E, thereby extending circuit from the zero voltage source through a verifier timing cam contact V4, now closed, thence through normally closed relay contacts R22–1, R33–11 and R27–4 and the relay contact R28–4 (now closed) to the "hold" (H) coil of a relay R50, FIG. 6C. In the present instance this coil H actually is utilized as a "pick" coil to energize relay 50. R28 also establishes a holding circuit for itself through the normally closed relay contacts R22–2, or the normally closed cam contact V2, FIG. 6D, closed relay contact R28–1, normally closed relay contact R52–1 and tube T5. Contact R28–3 (FIG. 6B), in transferring, closes a circuit to the keyboard restore magnet 205, FIGS. 6B and 3, thereby opening the keyboard restore contact 207, FIGS. 3 and 6A, so that manual verification cannot be performed.

Energization of R50 initiates the above-mentioned dummy cycle, the purpose of which is to cause a one-column advance of the detail card C and of the program card PC (without an accompanying column verification), thereby moving the program card from column 1 to column 2 and moving the detail card from column 0 to column 1. Referring to FIG. 6B, the closure of relay contact R50–3 extends zero voltage to the control grid of a tube T7, thereby rendering this tube conductive. The verifier clutch magnet 224 is included in the plate circuit of tube T7, so that this magnet 224 becomes energized when tube T7 conducts. Consequently, the verifier clutch is actuated to initiate a revolution of the verifier cam shaft, on which are mounted the timing cams for respectively operating the timing contacts V1–V7 shown in various parts of the circuit diagram. The make and break times of the respective cam contacts are represented graphically in FIG. 7.

According to conventional practice, the verifier cycle actually starts from a position arbitrarily designated as the 345° position of the verifier cam shaft, and it ends when this shaft again attains a 345° position, such reference points being chosen for convenience only. Hence a timing cam contact which is adapted to open at, say 355° is considered to be a "normally closed" contact, inasmuch as the cam shaft will not yet have attained this position if and when it comes to rest at the end of that cycle.

R50, when it is energized as just described, also closes its contact R50–5, FIG. 6D, thereby extending zero voltage from the closed program contact No. 2 to the control grid of a tube T9, which has in its plate circuit the pick coil P of a relay R51, otherwise known as the "automatic left-zero" (ALZ) control relay. R51 thereupon energizes. Various holding circuits will be established for this relay in due course to maintain it energized, as will be explained presently. A holding circuit also is established for R50 through contact V6 and R50–1, closed, FIG. 6C.

When the cam contact V3, FIG. 6B, closes at 5° of the dummy cycle, circuit is extended from zero voltage through the closed relay contacts R50–2 and R28–5 to the pick coil of R27, causing this relay to energize. R27 establishes a holding circuit for itself through a normally closed cam contact V6, FIG. 6C, and through its contact R27–5 now closed. Relay contact R27–2, FIG. 6B, closes to by-pass V3 and R50–2, thereby establishing an additional hold circuit for R27, through R28–5.

Referring to FIG. 6C again, R43 is an "O.K. verify" relay, which usually is energized when the cam contact V5 closes, provided the verify contacts 159 also are closed at that time. The verify contacts 159 remain closed if the data sensed in a column of card C corresponds with the setting of the interposer magnets 118, FIG. 1. There also are provided some additional circuits for energizing R43 in special instances. One of the special circuits for energizing R43 is established when R50 energizes, as explained above, thereby transferring its contacts R50–4, FIG. 6C, to establish a shunt path around the verifying contact 159 (through normally closed relay contact R54–1) to the pick coil of R43, causing R43 to energize at 70° of the dummy cycle when the cam contacts V5 close.

When cam contacts V5, FIG. 6C close at 70°, circuit is extended through the transferred relay contacts R27–6 and R51–3 and the normally closed contact R54–3 to the 0 interposer magnet 118, FIG. 6A, thereby automatically energizing this interposer magnet. In the present dummy cycle this action is without effect, because the detail card has not yet escaped to its column-1 position and, therefore, is not yet ready to have a zero test performed in its first column. In subsequent zero test cycles which are about to be described, however, the automatic energization of the 0 interposer magnet will be seen as a necessary step in the verification of left-zeros. The zero interposer setting initially established during the dummy cycle as just described is, in effect, stored for subsequent comparison with the data read from column 1 of the detail card CC, as will be explained hereintfter.

When the "0" interposer 122, FIG. 1, is actuated by the energization of its corresponding interposer magnet 118, the interposer bail contacts 134 are closed. This causes a circuit to be extended from cam contact V4, FIG. 6E, to the winding of R5, whereupon this relay energizes. The energization of R5 in the present type of automatic operation is without any useful effect, this relay being designed to serve primarily in manual verification operations of the machine. Hence, the operation of R5 generally will be disregarded hereinafter, except as it is depicted in the timing diagrams.

Before the automatic verification of zeros can commence, it is necessary that the detail card escape from column 0 to column 1. With R43 energized as hereinabove described, contacts R43–2, FIG. 6B, are transferred. Similarly, with R27 energized, contact R27–3 is closed. As a result of these actions, a circuit is extended to the control grid of a tube T3, thereby conditioning this tube for conduction. The conduction of tube T3, is delayed, however, until 180° of the dummy cycle, when cam contact V1 closes. Such closure of contact V1 causes T3 to conduct, thereby energizing the escape magnet 222 in its plate circuit. The escapement wheel 218, FIG. 2, thereupon is released and commences to advance. In a well-known manner, the movement of wheel 218 closes an escapement armature contact 223, FIGS. 2 and 6B, thereby extending voltage through the contact 223 to the control grid of a tube T1. As tube T1 conducts, it energizes an escape interlock relay R22, the pick coil of which is in the plate circuit of T1. When R22 energizes, it opens its contact R22–3, FIG. 6B, thereby breaking the circuit through which the escape magnet 222 has been energized. As magnet 222 deenergizes, it releases its armature 220, FIG. 2, which then seats in the next tooth of the escapement wheel 218. Thus, wheel 218 has been permitted to advance one tooth, causing the detail card to escape to its column-1 position. R22 continues to be held through its transferred contacts R22–1, FIG. 6E, and the cam contacts V4.

As mentioned hereinabove, a special pick circuit for R43 was established when R50 energized to transfer its contacts R50–4, FIG. 6C, and cam contact V5 closed. A holding circuit was established for R43 when it closed its contact R43–1, extending circuit through cam contact V4 (when closed) to the H coil of R43, FIG. 6E.

The verifier clutch magnet 224, FIG. 6B, which initially was operated when R50 energized to close its contact R50–3, is deenergized when R50 is released at the V6 break time (145°). However, the verifier clutch still remains engaged at least for one full revolution of the verifier cam shaft. The magnet 224 is energized again when contact R22–4 closes. FIG. 6B, and it remains energized until cam contact V5 opens in the following cycle at 140°, thereby continuing the rotation of the verifier cam shaft beyond the normal 345° latch-up point of the clutch.

As mentioned above, the ALZ relay R51, FIG. 6D, initially was picked through a circuit including the No. 2 program contact and the closed relay contact R50–5. This initial ALZ pick circuit is broken when R50 deenergizes at the V5 break time (145° of the dummy cycle, FIG. 7). Thereafter the circuit to the pick coil of ALZ relay R51 is continued through contact R51–6 transferred, normally closed contacts R52–3 and R54–6 and program contact No. 2 until escapement occurs at 180° of the dummy cycle in the manner above mentioned. When the program card escapes into its column 2, the No. 12 program contact will close and continue to cause T–9 to conduct and ALZ relay R51 to be held energized through contact R52–3, normally closed, and contact R51–6 transferred until the end of the field or until a condition other than zero is sensed, whichever occurs first, as will be explained presently.

The dummy cycle having completed itself, the first zero test cycle follows without interruption, due to the fact that the verifier clutch magnet 224 is being held energized through relay contact R22–4, FIG. 6B. The sequence of events in this first zero test cycle is depicted by the timing diagram, FIG. 7. In the initial part of this cycle the detail card C is in its column-1 position while the program card is in its column-2 position. The machine now checks to determine the presence or absence of a zero hole in column 1 of the detail card C. The zero interposer setting established during the preceding dummy cycle is still in effect at this time, and if this agrees with the setting of the verifier pins as they sense column 1, then the verify contact 159, FIGS. 1 and 6C, remains closed. Hence, although the "O.K. Verify" relay R43 deenergizes when the cam contact V4 opens at 30° of this first zero test cycle, FIG. 7, R43 again energizes when the cam contact V5 closes at 70° of this cycle, and it remains energized during the balance of this cycle and for at least the first 30° of the second zero test cycle.

When contact V4 opened at 30° of the first zero test as just described, it also deenergized R5 and R22, which were being held through this contact. This action was without any immediate effect.

Between 70° and 140° of the first zero test cycle, a new zero setting of the interposers 122 and fingers 146, FIG. 1, automatically is established for use in the next zero test cycle. Thus, the closure of cam contact V5, FIG. 6C, at 70° again extends voltage through relay contacts R27–6 transferred, R51–3 transferred and R54–3 normal to the 0 interposer magnet 118, FIG. 6A. As the 0 interposer magnet operates, it sets up the interposers for checking a zero at the beginning of the next zero test cycle, after the detail card has advanced to its next column position.

Referring again to the first zero test cycle, FIG. 7, it is necessary to produce a one-column escapement of the detail and program cards, now that the presence of a zero in column 1 of the detail card has been verified. With R43 being held energized as described hereinabove, a one-tooth escapement of the card feed occurs when V1 (FIG. 6B) closes at 180°, in the manner previously explained, whereby the detail card C escapes from column 1 to column 2, and the program card escapes from column 2 to column 3. Moreover, with R22 being re-energized as a result of the escapement step just described, the machine is conditioned to initiate another verifying cycle without interruption.

The second zero test cycle now is performed to determine whether a zero is present in column 2 of the detail card C. Assuming that such is the case, this cycle proceeds in the same manner as described above for the first zero test cycle, except that now the detail card C escapes to column 3 while the program card escapes to column 4, and the next test cycle immediately is initiated. Again assuming that a zero is present in the detail card column 3 now being tested, the performance of the zero test cycle causes the detail card to escape to column 4 while the program card escapes to column 5.

In column 4 of the detail card (FIG. 4) it is assumed that a number other than 0 is recorded, for example, the digit 4. The verifying cycle commences in the customary manner as described above for the preceding test cycles, but due to the lack of correspondence between the zero interposer setting and the digit now being sensed in the detail card column, the verify contact 159 will open during the early portion of this cycle. One immediate result of this is to energize the "first error" relay R33, as indicated in "Non-zero Detection Cycle," FIG. 7. As shown in FIG. 6C, the H coil of R33 is wired to buck the P coil of this relay. Normally both coils are energized concurrently, and their magnetic fields neutralize each other to keep R33 deenergized. When the contact 159 opens in response to a non-verify condition, however, the relay coil R33–H fails to energize, thereby permitting R33 to be picked through its P coil when V5 closes. R33, in energizing, opens its contact R33–6, FIG. 6C, in series with contact 159 and the P coil of R43. Contact R33–1, FIG. 6B, closes, establishing a hold circuit for R51 through R51–1 transferred and the R51–H coil; R33 also establishes a hold circuit for itself through R36–12, FIG. 6C, so long as R36 remains deenergized.

As a consequence of the actions above described, and particularly the opening of R33–6, R43 fails to be reenergized. With R43 unenergized, its contacts R43–2, FIG. 6B remain in their normal state, thereby preventing the energization of the escape magnet 222. Thus, the detail card is held in its column-4 position, while the program card remains in its column-5 position.

Figure 6E:
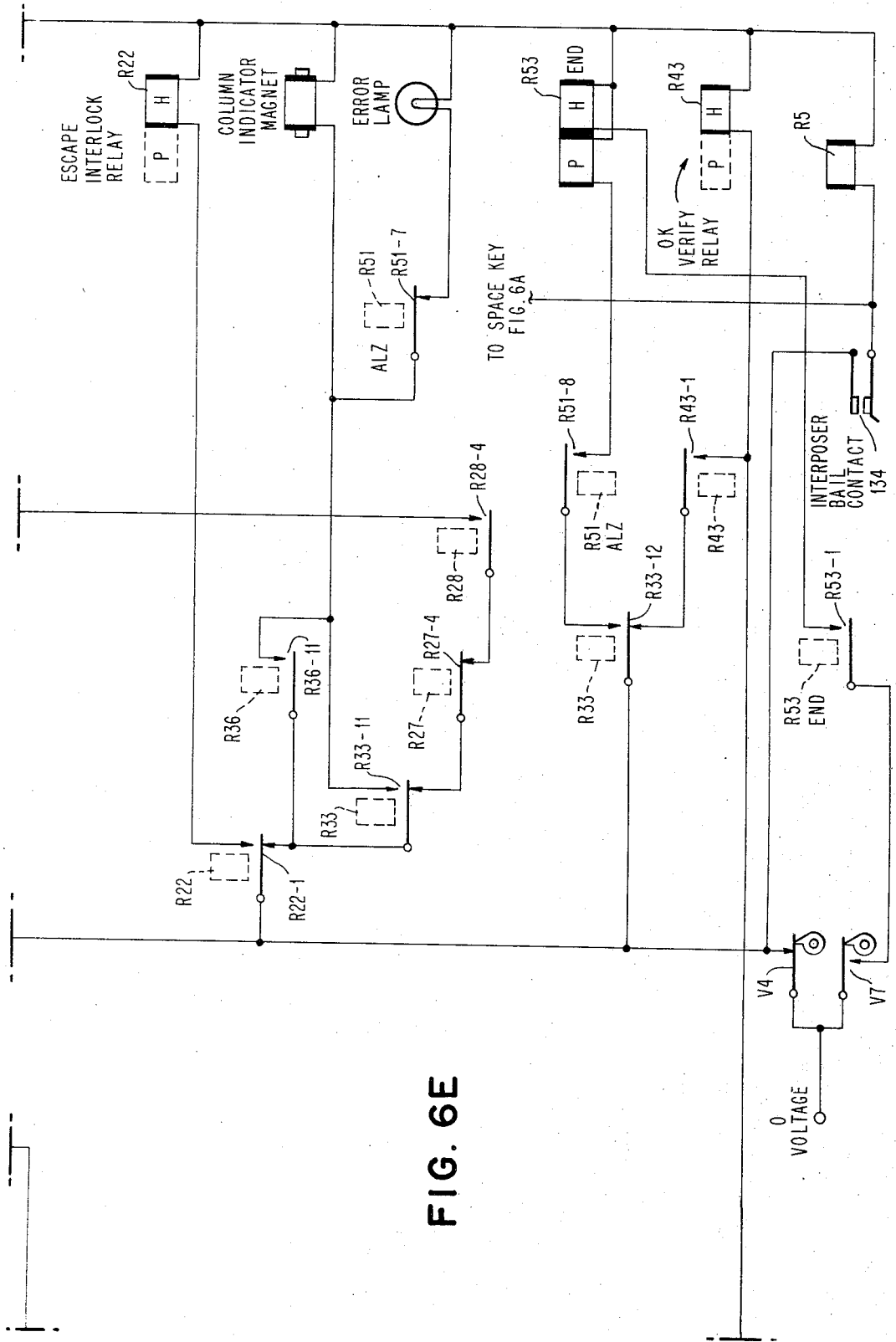

The energization of R33 picks R52, FIG. 6D, and also conditions R53, FIG. 6E, for subsequent energization when V4 closes at 130°. When R52 energizes, it opens its contact R52–1, FIG. 6D, thereby breaking all of the hold circuits for R28, which thereupon releases. As R28 releases, it breaks one of the hold circuits for R27, FIG. 6B. However, R27 continues to be held through V6 and its H coil, FIG. 6C, until V6 opens at 145°, whereupon R27 deenergizes. When R53 (otherwise known as the "end" relay) energizes, it establishes a holding circuit for itself through its contacts R53–1 and cam contact V7, FIG. 6E. Through its contact R53–4, FIG. 6D, now transferred, R53 also establishes a circuit for maintaining the verifier clutch magnet 224 (FIG. 6B) operated through the normal relay contacts R43–2. Thus, the verifier clutch is held engaged, and a new cycle (herein termed a "false" cycle) will commence.

The purpose of the "false" cycle is to place the machine in a condition for manual verification, now that the series of left-zeros (columns 1–3) has been completely verified. At 70° in this cycle, V5 closes and causes the "error reset" relay R36 to energize, this energizing circuit being established through the relay contacts R53–2 closed and R27–6 normal. R36 then closes its contact R36–1 to establish a holding circuit for the ALZ relay R51, such circuit extending from cam contact V4, FIG. 6E, through R51–5 transferred, FIG. 6C, R36–1 closed and R51–1 transferred, FIG. 6B, to the H coil of R51. Therefore, R51 continues to be held energized throughout this cycle and during the remaining time that R36 continues energized. R52, FIG. 6D, also continues energized while R36 remains energized. R33 is released when contact V5 opens at 140° of this cycle. R53 is released when cam contact V7 opens at 158°, and when this occurs, contacts R53–4, FIG. 6D, resume their normal state, thereby breaking the circuit through which the verifier clutch magnet 224, FIG. 6B, had been held energized. Thus, the false cycle ends with relays R36, R51 and R52 held energized, whereas all of the other relays described hereinabove now are in a deenergized state, and the keyboard restore contact 207, FIG. 6A, is closed. R36, R51 and R52 will be released when contact V4 opens at 30° in the following verification cycle.

The error lamp shown in FIG. 6E, which normally lights when an error has been detected, is prevented from lighting in this instance by the contact R51–7, now open. The reason for disabling the lamp is that it is not desired to have an error indication shown when actually the left-zero verification operation has progressed in the intended manner as far as it can be carried out, and no "error," properly so-called, has been found. Columns 4 and 5 now most be manually verified in the customary manner. Inasmuch as the manual verification procedure is well known, it will not be described herein.

In the foregoing example it was assumed that left-zeros were found in all of the columns where they were supposed to be present. If a significant digit had been punched inadvertently in a column where a left-zero should have been, the ALZ operation then would have terminated at that column. It is the operator's responsibility to read the column indicator when ALZ verification stops, to determine whether the card is then in the proper column. If not, the reason for the premature stoppage must be investigated. Similarly, if ALZ verification extends past the column where it should have ended, this is detected by reading the column indicator, and the cause of the malfunction then is investigated.

*Blank column verification (BCV)*

In the example illustrated herein (FIGS. 4 and 5) the detail card C is supposed to have all blank columns in its field 2 (columns 6–10). Assuming this to be the case in the present instance, all of the verifier sensing pins 110, FIG. 1, will be blocked by the card C each time one of these columns 6–10 is sensed. In a blank column verification (BCV) operation, none of the interposer magnets 118 controlling the fingers 146 will be operated, so that the verify contacts 159 will remain closed due to the lack of relative movement between the fingers 146 and pins 110.

The BCV operation now will be described in detail. This operation entails many of the functions performed under the control of relays R51, R52 and R53 during an ALZ operation, plus some additional functions performed under the control of a BCV relay R54, FIG 6A. Thus, a BCV operation is in one sense an extension of an ALZ operation. Referring to the left side of the timing diagram in FIG. 8, the detail card C, having had its columns 4 and 5 manually verified and presumably found to be correctly punched, now is resting in its column-5 position awaiting escapement to column 6. The program card meanwhile has advanced to column 6, and it has caused the No. 2 program contact to close in response to the sensing of the No. 2 hole in its column 6. This generates the signal which initiates an ALZ operation and also prepares the machine for a BCV operation. In the present instance the result of this action is to send the machine through three successive cycles that respectively correspond to the dummy cycle, the non-zero detection cycle and the false cycle described hereinabove in connection with the ALZ operation (FIG. 7). These first three cycles are depicted again in FIG. 8.

Briefly reviewing the first three cycles of the BCV operation, the relay 28, FIG. 6D, is energized by closure of the No. 2 program contact, and it brings about the energization of R50, R51 and the verifier clutch magnet 224, thereby initiating a dummy cycle, during the course of which R27 also is energized. Energization of the 0 interposer magnet by the closure of cam contact V5 is without effect in this cycle, inasmuch as transferred contacts R50–4, FIG. 6C, presently are bypassing the verify contact 159. R43, therefore, is picked when V5 closes, and the card escapement mechanism functions to advance the detail card to column 6 while the program card goes to column 7. The field definition (No. 12) codes in columns 7–10 of the program card PC (FIG. 5) now take effect to keep the ALZ relay R51 energized, there being no need to deenergize this relay so long as blank columns are encountered in this field of the card. Up to this point, the machine still is functioning as though it were going to perform a left-zero checking operation. However, it will be noted (FIG. 4) that column 6 of the detail card is blank. Thus, there is disagreement between the zero interposer setting and the setting of the verifier sensing pins, causing the verify contact 159, FIGS. 1 and 6C, to open. This brings about the energization of the error relay R33 due to the unbalancing of its P and H windings. As a consequence, R52 and R53, FIGS. 6D and 6E, are picked in due course, thereby conditioning the machine to execute a false cycle and come to rest with the detail card still in column 6, and with the relays conditioned as above explained under "ALZ Verification."

It is now necessary for the operator to investigate the cause of the stoppage, and when she observes that the columns which are to be verified are blank, she then presses a selected control key to initiate an automatic blank-column verification. In the present instance it is assumed that this function will be initiated by actuating the "skip" key of the operator's keyboard. However, any other functional key, such as the "space" key, could be adapted to this purpose. Actuating the skip key under the present conditions does not produce the usual skip operation of the machine, because the relay contacts R51–10, FIG. 6A, now are in their transferred condition due to the previous energization of the ALZ relay R51. Hence, the closure of the skip key now extends voltage through contacts R51–10 transferred and R36–2 closed to the pick coil of the BCV relay R54, causing this relay to energize.

In energizing, R54 opens its contact R54–3, FIG. 6C, to prevent any subsequent energization of the zero interposer magnet during the BCV operation. R54 transfers its contacts R54–5 and R54–6, FIG. 6D, to complete a circuit extending from the No. 12 program contact through contacts R54–6 transferred, R27–1 normal and R54–5 transferred to the tube T5, which thereupon conducts and energizes the relay 28 in its plate circuit.

The energization of R28 brings about the energization of R50 in the same manner as described hereinabove. In the present instance, however, the relay contacts R50–4 are not permitted to bypass the verifier contacts 159, FIG. 6C, because the relay contacts R54–1 now are transferred, with the effect that the verify contacts 159 again control the operation of R33 and R43. Contact R50–3, FIG. 6B, closes to cause energization of the verifier clutch magnet 224, producing a cycle of the verifying machine. In this cycle no interposer magnets are operated, so that the machine will test only for the presence of a blank column above the sensing pins (column 6 of the detail card). Assuming that this column is blank, the verify contact 159 remains closed, causing R43 to energize at 70° when V5 closes. In the course of this cycle R27, FIG. 6B, also energizes, so that circuit is extended through the transferred relay contacts R27–3 and R43–2 to the escape magnet 222 causing a column escapement, whereby the detail card moves to its column-7 position, and the program card moves to its column-8 position. During this cycle R51 is held continuously energized through the No. 12 program contact. The operations just described, commencing with the energization of R54, are depicted in the extreme right-hand section of FIG. 8.

Additional blank-column verification cycles take place until a detail card column that is not blank is sensed or until the programming for ALZ-BCV is terminated (whichever occurs first). For the present, it will be assumed that all of the columns in field 2 (columns 6–10) of the detail card C are blank, as represented in FIG. 4. A condition as just described is depicted graphically in the timing diagram of FIG. 8A, which represents the last few cycles of blank column verification in a completely blank detail record field.

It will be recalled that the No. 12 program contact remains continuously closed as long as No. 12 index holes are sensed in a series of consecutive columns, such as columns 7–10, of the program card PC, FIG. 5. As the detail card C escapes from column 9 to column 10, the program card PC escapes from column 10 to column 11. It will be assumed for present purposes that column 11 on the program card PC is blank, this being the situation, for instance, when the field commencing in column 11 of the detail card C is small enough to be manually verified without any need for ALZ verification. Hence, referring again to FIG. 8A, the No. 12 program contact opens as soon as the program card escapes to its column-11 position. This immediately breaks the holding circuit through this program contact to the P coil of R51, FIG. 6D. R51 also has an H coil, FIG. 6B, and an associated holding circuit that extends through contact R51–1 and contact R36–1, FIG. 6C, thence through additional relay contacts R51–5 and R43–4 to cam contact V4, FIG. 6E. However, this hold circuit is ineffective in the present instance because R36–1 and R43–4 are both open. It having been assumed in the present example that there are no program codes in columns 11 et seq. of the card PC for re-energizing R51, this relay, therefore, deenergizes when the No. 12 program contact opens, as depicted in FIG. 8A. As relay contact R51–4 opens, FIG. 6D, it breaks the holding circuit for R54, which thereupon deenergizes. R27 and R28 are held energized for the time being through their respective holding circuits shown in FIGS. 6C and 6D. R28 releases at 355° when cam contact V2 opens. R27 remains energized until cam contact V6 opens at 145° in the following (last blank-column test) cycle.

As the detail card escapes to column 10, the escape interlock relay R22 is picked and continues energized until 30° of the next cycle. Contact R22–4 closes, FIG. 6B, and re-establishes the circuit for energizing the verifier clutch magnet 222, thus insuring that another verification cycle will ensue. In this succeeding cycle (the last blank-column test, FIG. 8A) column 10 of the detail card is verified as being blank, causing R43 to be re-energized. However, since neither R27 nor R5 is energized in the latter half of this cycle, no circuit will be extended through contact R27–3 or R5AL, FIG. 6B to T3, so that no escapement occurs in this cycle. With R43 energized, moreover, no energizing circuit is established for re-energizing the verifier clutch magnet 224, FIG. 6B. Therefore, the machine stops at the end of this cycle (FIG. 8A), with R43 still held energized through cam contact V4, FIG. 6E. The machine now is in a condition to permit manual keying verification, without automatic left-zero operation. (It is evident, of course, that automatic blank-column verification could be programmed at this point, if desired.)

It has been assumed hereinabove that all of the columns in field 2 of the detail card C are blank. If, however, a non-blank column is encountered in this field, the machine then goes through a non-blank detection cycle followed by a false cycle, as represented graphically in FIG. 8B. This action is very similar to the non-zero detection operation described above in connection with FIG. 7, and it will not be described in detail. R54, FIG. 6D, drops out when the "end" relay R53 is energized. At the end of the false cycle, FIG. 8B, the machine stops without lighting the error lamp. At this point the operator must intervene to determine the reason for the stoppage.

As will be apparent from the foregoing description, a blank-column verification (BCV) operation is very similar to an automatic left-zero (ALZ) operation. However, unlike the ALZ operation, the BCV operation does not initiate itself automatically. Once initiated, however, a BCV operation proceeds automatically for checking the presence of blanks in subsequent columns of that card field, essentially in the same manner that the machine automatically checks for zeros in columns to the left of the first significant digit in an ALZ operation.

Utilization of the automatic left-zero and blank-column verification features described hereinabove greatly increases the effectiveness of a record card verifying machine by eliminating many manual keying motions and mental calculations which are tedious, time-consuming and subject to human error. Thus, a more efficient use of such machines is made possible by this invention.

While the invention has been particularly shown and described with reference to a preferred embodiment thereof, it will be understood by those skilled in the art that various changes in form and details may be made therein without departing from the spirit and scope of the invention.

What is claimed is:

1. In a record verifying machine adapted to read a detail record and a program record concurrently in column-by-column fashion, the combination of:
    settable elements adapted to be set selectively in various states to represent selected data;
    program-controlled setting means responsive to the reading of a predetermined control indicium in the program record to establish a predetermined automatic setting of said settable elements during the reading of at least one detail record column;
    and reading control means for comparing the setting of said settable elements with data read from the detail record to interrupt the reading of the detail record at a column thereof which does not contain data corresponding to the setting of said settable means;
    said program-controlled setting means being adapted, upon the sensing of said predetermined control indicium, to establish a zero setting of said settable elements, thereby enabling said reading control means to check automatically for the presence of a zero representation in at least one detail record column following the establishment of such zero setting;
    said program-controlled setting means including means responsive to the sensing of successive additional control indicia in the program record for causing the zero setting of said settable elements to be effectively maintained during the reading of consecutive record columns in a given detail record field until the first column in that field lacking a zero representation is sensed.

2. In a record verifying machine which is adapted to compare data read from successive columns of a detail record with data represented by selective settings of a plurality of individually settable elements and which also is adapted to read a program record for sensing control indicia recorded therein, the combination, with said settable means, of:
    first setting means normally effective when operated to set said settable elements into variable states representing selected data;
    second setting means operable independently of said first setting means and responsive at least in part to the sensing of control indicia in the program record for causing said settable elements to have a predetermined state in response to the sensing of a predetermined control indicium;
    column escapement means operable to produce column advancing movements of the detail and program records;
    and verifying means controlling the operation of said column escapement means for enabling or preventing the advance of the detail and program records according to whether or not the data read from the detail record corresponds to the state of the settable elements.

3. The combination set forth in claim 2 wherein said second setting means is effective when operated to produce a zero setting of said settable elements, thereby enabling said verifying means to check for the presence of a zero in the detail record column then being read.

4. In a record verifying machine which is adapted to compare data read from successive columns of a detail record with data represented by selective settings of a plurality of individually settable elements and which also is adapted to read a program record for sensing control indicia recorded therein, the combination, with said settable means, of:
    manual key means normally effective when operated to set said elements into variable states representing selected data;
    program-controlled setting means responsive to the sensing of a predetermined control indicium in the program record for setting said elements to represent zero;
    column escapement means operable to produce column advancing movements of the detail and program records;
    and verifying means controlling the operation of said column escapement means for enabling or preventing the advance of the detail and program records according to whether or not a zero is present in the detail record column then being read.

5. In a record verifying machine operable at least partly under the control of a program record for verifying the data representations positioned at selected index points in at least some of the columns of a detail record, the combination of:
    program record reading means for sensing in the program record the following indicia:
        a predetermined control indicium calling for the automatic reading and verification of left zeros commencing at a selected column of the detail record
        and succeeding control indicia defining the length of the detail record field in which left zeros are to be verified;
    a plurality of individually settable elements adapted to represent selected data in accordance with their relative settings;
    automatic zero setting means controlled by said program record reading means for automatically setting said elements to represent zero in response to the sensing of said predetermined control indicium and for effectively maintaining such automatic zero setting in response to the sensing of said field definition indicia;
    detail record reading means;
    comparing means for comparing the data read by said detail record reading means with data represented by the setting of said settable elements;
    and control means responsive to said comparing means for controlling said detail and program record reading means and said automatic zero setting means to permit automatic reading of said records by the machine and automatic zero setting of said elements while there is agreement between the data read from the detail record and the zero setting of said elements and to interrupt such automatic reading and zero setting when the data read from the detail record is other than zero.

6. In a record verifying machine operable at least partly under the control of a program record for verifying the presence or absence of a predetermined condition in at least some of the columns of a detail record, the combination of:

program record reading means for sensing in the program record the following indicia:
a predetermined control indicium calling for the automatic reading and verification of a predetermined condition in a detail record field commencing at a selected column thereof
and succeeding control indicia defining the length of the detail record field in which such condition is to be verified;
a plurality of individually settable elements adapted to represent selected data or the absence thereof in accordance with their relative settings;
setting control means controlled at least in part by said program record reading means for causing said settable elements to have a state representing said predetermined condition when said predetermined control indicium is sensed;
detail record reading means;
comparing means for comparing the condition of the detail record columns sensed by said detail record reading means with the state represented by the setting of said settable elements;
and reading control means responsive to said comparing means and controlling said detail and program record reading means to permit automatic reading of said records by the machine while there is agreement between the respective states of the sensed detail record columns and said settable elements and to interrupt such automatic reading when there is disagreement between said states.

7. In a record card verifying machine operable at least partly under the control of a program record for verifying data contained in a detail card, the combination of:
record reading means;
means for advancing a detail record column-by-column past said record reading means;
a group of settable elements adapted to be set selectively for representing data to be verified in the detail record;
first control means responsive to the presence of a predetermined control indicium in the program record for effectively maintaining a predetermined setting of said settable elements;
second control means responsive to a disagreement between the setting of said settable elements and the data read by said record reading means for preventing any further reading of the detail record so long as the state of disagreement persists;
and third control means responsive to disagreement between the setting of said settable elements and the data read by said record reading means for discontinuing said predetermined setting of said elements.

8. In a record verifying machine operable at least partly under the control of a program record for verifying data represented in a detail record, the combination of:
detail record reading means;
program record reading means;
settable means controlled at least in part by said program record reading means and adapted to assume a predetermined setting representative of a particular data condition in response to the sensing of a predetermined control indicium in the program record;
comparing means for determining whether the data read by said detail record reading means corresponds to the setting of said settable means;
and resetting means controlled by said comparing means for resetting said settable means when the setting thereof does not correspond to the data read from the detail record.

9. The combination set forth in claim 8 wherein said predetermined setting of said settable means is representative of zero, whereby said resetting means is rendered effective when the data read from the detail record is other than zero.

10. In a record verifying machine operable at least partly under the control of a program record for verifying data represented in a detail record, the combination of:
detail record sensing means;
program record sensing means;
a plurality of interposers selectively settable to represent data or the absence thereof;
relay means controlled at least in part by said program record sensing means for enabling said interposers to assume a predetermined state in response to the sensing of a predetermined control indicium in the program record;
comparing means for determining whether the information sensed by said detail record sensing means corresponds to the state of said interposers;
and other relay means controlled by said comparing means for disabling said first relay means and preventing further operation of said detail and program record sensing means when the information sensed in the detail record does not correspond to the state of said interposers.

11. The combination set forth in claim 10 wherein the first-named relay means is adapted to set said interposers to a state representative of zero in response to the sensing of said predetermined control indicium.

References Cited
UNITED STATES PATENTS 2,615,333 10/1952 Gardinor et al. _____ 73—156
2,841,981 7/1958 Rockefeller et al. _____ 73—156

DAVID SCHONBERG, *Primary Examiner.*